(12) United States Patent
Berry et al.

(10) Patent No.: US 7,392,845 B2
(45) Date of Patent: Jul. 1, 2008

(54) METHOD OF TREATING OIL OR GAS WELL WITH BIODEGRADABLE EMULSION

(75) Inventors: Sandra L. Berry, Tomball, TX (US); Brian Beall, Spring, TX (US)

(73) Assignee: BJ Services Company, Houston, TX (US)

( * ) Notice: Subject to any disclaimer, the term of this patent is extended or adjusted under 35 U.S.C. 154(b) by 175 days.

(21) Appl. No.: 11/388,103

(22) Filed: Mar. 23, 2006

(65) Prior Publication Data

US 2007/0225174 A1    Sep. 27, 2007

(51) Int. Cl.
*E21B 37/00*    (2006.01)
*C09K 8/52*    (2006.01)

(52) U.S. Cl. .................. 166/300; 166/304; 166/312; 507/203; 507/261; 507/266; 507/905; 507/929

(58) Field of Classification Search ................ 166/291, 166/300, 304, 312; 507/203, 261, 266, 905, 507/929
See application file for complete search history.

(56) References Cited

U.S. PATENT DOCUMENTS

| | | | | |
|---|---|---|---|---|
| 2,343,136 A | * | 2/1944 | Dobson et al. .............. | 507/201 |
| 4,359,391 A | * | 11/1982 | Salathiel et al. ............. | 507/277 |
| 5,355,958 A | * | 10/1994 | Pauls et al. ................ | 166/307 |
| 5,985,177 A | * | 11/1999 | Yoshida et al. .............. | 516/113 |
| 6,562,764 B1 | * | 5/2003 | Donaldson et al. .......... | 507/277 |
| 6,631,764 B2 | * | 10/2003 | Parlar et al. ................. | 166/278 |
| 7,134,496 B2 | * | 11/2006 | Jones et al. .................. | 166/278 |
| 7,188,676 B2 | * | 3/2007 | Qu et al. ..................... | 166/312 |
| 7,222,672 B2 | * | 5/2007 | Blauch et al. ............... | 166/278 |
| 2005/0155761 A1 | * | 7/2005 | Blauch et al. ............... | 166/278 |
| 2005/0202978 A1 | * | 9/2005 | Shumway .................... | 507/203 |

OTHER PUBLICATIONS

Berry, S.L. et al; "Laboratory Development and Application of a Synthetic Oil/Surfactant System for Cleanup of OB and SBM Filter Cakes"; Society of Petroleum Engineers (SPE 97857); 2006; pp. 1-12.

Berry, S.L.; "Optimization of Synthetic-Based and Oil-Based Mud Displacements with an Emulsion-Based Displacement Spacer System"; Society of Petroleum Engineers (SPE 95273); 2005; pp. 1-11.

Shrieve Chemical Products & Shrieve Products International, Ltd.; "Product Data Sheet Bio-Base® 560 Base fluid with a high n-paraffin content"; Jul. 2004.

Shrieve Chemical Products & Shrieve Products International, Ltd.; "Material Safety Data Sheet Bio-Base® 637"; May 2004; pp. 1-9.

* cited by examiner

*Primary Examiner*—George Suchfield
(74) *Attorney, Agent, or Firm*—Jones & Smith, LLP; John Wilson Jones

(57) ABSTRACT

A biodegradable water-in-synthetic oil base emulsion, effective in the removal of filter cakes, consists of an external phase of a surfactant emulsified in a paraffinic base oil. The emulsion is particularly effective in breaking-down the interfacial rheological properties of oil base mud and synthetic oil base mud filter cakes and acts as a demulsifier to break the water-in-oil emulsions present in such oil base and synthetic oil base muds.

20 Claims, No Drawings

METHOD OF TREATING OIL OR GAS WELL WITH BIODEGRADABLE EMULSION

FIELD OF THE INVENTION

The invention relates to a process of treating an oil or gas well having a wellbore with a biodegradable fluid emulsion of a synthetic oil base and a surfactant.

BACKGROUND OF THE INVENTION

The increased production flow area provided by a horizontal, as compared to a vertical, wellbore has driven an increase in the drilling and completion of horizontal wells. Such wells have long open-hole sections which remain in contact with the drilling fluid for long periods of time in overbalanced conditions, forming a filter cake on the formation and also thereby initiating solids invasion that may induce formation damage. As a result, the selection of drilling fluid has a major effect on minimizing skin development and maximizing oil production.

Performance advantages of oil-based muds (OBM) and synthetic-based muds (SBM), such as higher penetration rates, improved lubricity, shale stability, decreased fluid loss, and thinner filter-cake characteristics, give these systems advantages in reservoir-drilling applications over water-based mud systems. Furthermore, fluid losses to formation from oil based muds are less damaging since the base is composed of oil rather than water.

Most OBMs and SBMs are invert emulsions composed of droplets of aqueous fluid surrounded by a continuous oil phase. OBM and SBM filter cakes are composed of colloid particles and water droplets dispersed in an oil phase. Such filter cakes are hydrophobic and exhibit a permeability which is lower than the permeability of the rock.

After drilling is complete, a cleanup treatment to remove the OB/SB filter cake from the formation face is needed in order to minimize skin and formation damage, increase production flow and restore the productive zone to a near-natural state. Such cleanup treatments are needed in order to break down the interfacial rheological properties of the filter cake, wash the damaged zone of the wellbore and restore the formation's fluid transfer properties.

Historically, solvent- or aqueous-based systems have been used to remove oil based and synthetic oil based filter cakes. Typically, aqueous surfactant based systems are selected over solvent treatments as mud filter cake cleanup treatments for breaking the emulsion inside the cake and complete phase separation. However, such aqueous surfactant based treatment often creates additional damage by forming an emulsion block in the wellbore due to water saturation. Such emulsion blocks have the potential to block oil production. Further, such systems are either not biodegradable or are less efficacious than desired.

In order to meet more challenging, drilling applications such as for use in deepwater and high-temperature, high-pressure (HTHP) applications, and further to meet stricter health, safety, and environmental standards, new systems to remove OB and SBM filter cakes have been sought. In particular, there is a need for new systems that do not cause the problems associated with the aqueous systems of the prior art and which further are biodegradable.

SUMMARY OF THE INVENTION

An oil or gas well having a wellbore may be treated with a biodegradable synthetic oil base emulsion in order to remove a filter cake. The emulsion is particularly efficacious in the removal of oil based and synthetic oil based filter cakes.

The emulsion contains an external phase of a surfactant emulsified in the base oil. The base oil typically contains between from about 75 to about 99, preferably from about 85 to about 95, most preferably about 90, percent by weight of linear paraffins (alkanes).

Typically, the volume percent of the base oil in the emulsion is between from about 50 to about 75 percent.

The surfactant of the emulsion is preferably nonionic. Preferred nonionic surfactants include octylphenol polyethylene oxide ethers, nonylphenol polyethylene oxide ethers, linear alcohol polyethylene oxide ethers and sorbitan monooleate polyethylene oxide ethers.

Typically, the volume percent of the nonionic surfactant in the emulsion is between from about 3.5 to about 15 volume percent.

The emulsions are highly efficacious in breaking down the interfacial rheological properties of OBM and SBM mud cakes for diversified drilling mud systems. Percent mudcake removal efficiencies, indicative of mud filter demulsification and solids removal, are high when the emulsions are used with OBM and SBM filter cakes. Furthermore, the emulsions are highly efficient in breaking the emulsion inside the filter cake to decrease cake cohesion and wellbore adherence.

DETAILED DESCRIPTION OF THE INVENTION

Filter cakes may be removed from a wellbore and formation face with a biodegradable water-in-synthetic oil base emulsion. The emulsion is particularly efficacious in the removal of oil base or synthetic oil base filter cakes. The emulsions are capable of breaking the interfacial rheological properties of filter cake muds, thereby acting as a demulsifier to break water-in-oil emulsions and the adherence of the filter cake to the wellbore. In addition, the emulsion passes the "no-sheen" requirements for use in Gulf of Mexico applications as the emulsions did not produce a silvery or iridescent sheen on the surface of the water. The emulsion is lighter than water and covers the surface of the water, dissipating over time.

The emulsion contains an external phase of a surfactant emulsified in the base oil. The base oil typically contains between from about 75 to about 99, preferably from about 85 to about 95, most preferably about 90, percent by weight of linear paraffins (alkanes ), the remainder being olefins (alkenes). In a preferred embodiment, the base oil exhibits low viscosity (for instance, as low as 1.99 cSt (ASTM D-445). Preferred base oils include Bio-Base®637 (a mixture of alkanes and alkenes) and Bio-Base®560 (a hydrocarbon blend containing 90% linear paraffins—n-paraffins or n-alkanes), both of which are commercially available from Shrieve Chemical Products.

Typically, the volume percent of the base oil in the emulsion is between from about 50 to about 75, preferably between from about 55 to about 65, volume percent.

The surfactant of the emulsion is preferably nonionic. In a preferred embodiment, the surfactant is nonionic. Nonionic surfactants with HLB between from 1 to about 30 are preferred, most preferably those having a HLB between from about 10 to about 20.

Most preferred nonionic surfactants include oxyalkylated alkyl phenols such as octylphenol polyethylene oxide ethers and nonylphenol polyethylene oxide ethers as well as linear alcohol polyethylene oxide ethers and sorbitan monooleate polyethylene oxide ethers. Such nonionic surfactants include those sold under the commercial names of TERGITOL, TRITON, BRIJ, TWEEN and MAKON.

Suitable as nonionic surfactants are alkyl and alkylaryl polyether alcohols such as linear or branched polyoxyethylene alcohols, more preferably linear polyoxyethylene alcohols, comprising (a) from about 8 to about 30, preferably about 8 to about 20, carbon atoms, and (b) comprising about 3 to about 50 moles, most preferably about 3 to about 20 moles, ethylene oxide. Most preferred non-ionic emulsifiers are linear polyoxyethylene alcohols having from about 13 to about 15 carbon atoms and comprising about 10 moles ethylene oxide. Further, preferred emulsifiers include nonylphenol ethoxylate having a HLB value of about 16 and comprising 20 ethylene oxide units per molecule, octylphenol ethoxylate having an HLB value greater than 13.5, and nonylphenol ethoxylate having a HLB value greater than 13.

In another preferred embodiment, the non-ionic surfactants are a combination of alkylaryl ethoxylate and a polyethylene glycol (PEG) ester of fatty acids. Preferably, the alkylaryl ethoxylate is octyl, nonyl or dodecylphenol with 3 to 13 moles of ethylene oxide, while the PEG ester is of molecular weight range 200-600 with either one or two moles of unsaturated fatty acids.

Further preferred as nonionic surfactants are polyoxyethylene sorbitan monopalmitate, polyoxyethylene sorbitan monostearate, polyoxyethylene sorbitan monooleate, linear alcohol alkoxylates, alkyl ether sulfates, linear nonyl-phenols, dioxane, ethylene glycol and ethoxylated castor oils such as polyethylene glycol castor oil, dipalmitoylphosphatidylcholine (DPPC), polyoxyethylene (8.6) nonyl phenyl ether, ethylene oxide sulfonates (i.e., alkyl propoxy-ethoxysulfonate), alkyl propoxy-ethoxysulfate, alkylarylpropoxyethoxysulfonate and highly substituted benzene sulfonates.

Typically, the weight percent of the nonionic surfactant in the emulsion is between from about 3.5 to about 15, preferably from about 4 to about 10, volume percent. Optimization of the synthetic-oil/surfactant system should preferably be conducted on a given OB/SB mud sample to determine the proper concentration of active surfactants required to obtain complete emulsion breaking inside the filter cake and to disrupt cake cohesion.

The emulsion, essentially polymer-free, may further contain a pH adjuster, such as soda ash, to raise the pH to about 7-10 or more, and most preferably about 9 to 10.

The water is typically present in the emulsion in an amount between from about 25 to about 35, typically around 28, volume percent. The water increases the viscosity of the emulsion, rendering a higher carrying capacity for removed solids. In addition, it serves as a solvent for the pH adjuster and a means to activate the surfactant.

Further, the emulsion may be used in conjunction with an alcohol, glycol or glycol ether which principally serves to enhance the emulsion. Suitable alcohols, glycols and glycol ethers include mid-range primary, secondary and tertiary alcohols with between 1 and 20 carbon atoms, such as t-butanol, n-butanol, n-pentanol, n-hexanol and 2-ethyl-hexanol as well as detergent range alcohols ethoxylate, ethylene glycols (EG), polyethylene glycols (PEG), propylene glycols (PG) and triethylene glycols (TEG). When employed, the alcohol, glycol or glycol ether (or combinations thereof) may be present in the emulsion in an amount between from about 1 to about 5 volume percent.

The emulsion may further be used in conjunction with enzymes, buffers, surfactants, oxidizers and/or chemical breakers conventional in the art.

The average particulate size range of the emulsions typically is on the order of about 5 to about 50 nm in drop radius. The drops of the emulsion are generally large (>0.1 microns).

The oil based emulsions are advantageous since they prevent water-based emulsions in the formation. In addition, the oil-based/surfactant emulsion provides a more economical alternative to solvent-based systems. Further, the emulsions may further be used as breakers to weaken the OBM and SBM filter cake.

The emulsions are capable of separating the OB/SB mud system into its component phases. For example, the emulsions are capable of flocculating the water droplets of the mud systems. During flocculation, the droplets clump together forming aggregates or flocs. These droplets are close to each other, even touching at certain points, but may not lose their individuality. Coalescence then occurs. During coalescence, water droplets fuse to form larger drops. Coalescence leads to complete phase separation (oil and water) and emulsion breaking. Thus, the emulsions function in a demulsifying capacity and are capable of stabilizing the interfacial film components around the OBM/SBM droplets.

Use of the water-in-synthetic oil base emulsions is also effective in avoiding emulsion formation evidenced with aqueous based systems as well as water saturation around the wellbore. Aqueous surfactant-based treatments typically create additional damage by forming an emulsion block in the wellbore due to water saturation. These emulsion blocks have the potential to block the flow of oil production.

The following examples demonstrate the effectiveness of water-in-synthetic oil base emulsions in dissolving and removing synthetic oil based muds and oil based mud filter cakes and thus the practice of the present invention in a preferred embodiment. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

EXAMPLES

In the Examples, the following components were used:

Bio-Base 637 is a mixtures of alkanes and alkenes, a product of Shrieve Chemical Products Co.

Tween®81 is a polyoxyethylene (5) sorbitan monooleate, a product of ICI America, Inc.

The compositions of the synthetic oil-base/surfactant treatment fluids utilized in the Examples are as follows. All percentages expressed in the Examples are volume percentages, unless otherwise indicated.

Example 1

An emulsion was prepared consisting of 65% Bio-Base 637, 28% water, 3 pounds per barrel (ppb) soda ash and 7% Tween 81. The emulsion was prepared by introducing the oil and surfactant into a vessel and mixing the components at room temperature until uniformly mixed, about 10 minutes. To the resultant was added an aqueous system containing the soda ash. The components were then mixed at room temperature until uniformly mixed, about ten minutes. The resulting product contained linear parrafins and surfactant as the external phase and an aqueous internal phase. The pH of the emulsion was approximately 9 to 10

Examples 2-11

Ten field drilling mud systems from actual drilling operations with varying compositions were used to evaluate the effectiveness of the formulation to break down the interfacial rheological properties and well bore adherence of the mud cakes. Table I outlines the ten drilling mud systems as well as their mud density and rheological properties at 70° F.

TABLE I

| Example No. | Density | 600/300 | 200/100 | 60/30 | 6/3 | Gel/10 min Gel |
|---|---|---|---|---|---|---|
| 2 | 14.0 ppg | 200/110 | 75/42 | 27/17 | 6/5 | 5/25 |
| 3 | 9.0 ppg | 67/47 | 40/30 | 22/17 | 9/7 | 2/10 |
| 4 | 9.2 ppg | 105/62 | 45/25 | 15/6 | 1/1 | 1/2 |
| 5 | 14.0 ppg | 48/28 | 19/12 | 8/7 | 3/2 | 3/5 |
| 6 | 12.5 ppg | 64/34 | 24/12 | 12/7 | 2/1 | 1/1 |
| 7 | 13.3 ppg | 186/100 | 70/41 | 26/16 | 6/5 | 9/12 |
| 8 | 15.5 ppg | >320/220 | 172/92 | 57/32 | 8/5 | 7/22 |
| 9 | 15.9 ppg | 133/75 | 55/33 | 21/14 | 6/5 | 5/8 |
| 10 | 18.5 ppg | 292/160 | 112/62 | 42/27 | 12/9 | 10/14 |
| 11 | 18.8 ppg | >320/192 | 137/77 | 53/35 | 16/14 | 4/22 |

A dynamic (stirred) high temperature high pressure (HTHP) fluid loss cell was used to evaluate the effectiveness of the formulation in removing the drilling mud filter cakes. This modified HTHP filter press measured filtration properties under varying dynamic downhole conditions. A motor driven shaft was fitted with propellers at varying speeds inside a standard 500 ml HTHP cell. RPM settings ranges from 1 to 1600 rpm were selected to give laminar or turbulent flow to the fluid inside the cell. Power was driven to the stirring shaft by a timing belt that was easily accessible for quick adjustment and removal. A variable speed motor controlled through a speed control recorder (SCR) gave the ability to change the speed of the stirring shaft. A digital tachometer indicated the rpm reading of the stirring shaft.

The modified HTHP fluid loss cell was utilized to form the mud filter cake with each of the ten drilling mud systems and to test the formulation for mud filter cake breaking kinetics. In each test, a mud filter cake was obtained by filtration of the mud system on Fann specially hardened filter paper. A one lab barrel aliquot of the well mixed field drilling mud was poured into the HTHP cell and the cell top was capped. Each test mud was heat-aged for a 20-minute period at 150° F. (65° C.) with 300-rpm stirring shear stress. After the 20-minute heat-aging period, the mud filter cake was generated by applying a 250-psi nitrogen differential pressure to atmosphere with 300-rpm stirring shear stress on the HT/HP cell for three hours. Fluid loss data was recorded during the three-hour filter cake formation. After the 3-hour incubation period, the cell was depressurized and the initial mud filter cake was removed from the cell. The total weight and thickness of the mud filter cake was then determined.

A fresh lab barrel aliquot of each mud was then added to the Dynamic HT/HP fluid loss cell to generate a fresh filter cake and to evaluate the oil-based/surfactant system's ability to break and demulsify the mud filter cake. The procedure outlined above was repeated to generate the mud filter cake. At the end of the 3-hour period, the cell was removed from the heater jacket and depressurized. The HT/HP top cap was removed and the mud sample was decanted slowly from the cell. One lab barrel of the synthetic oil-based/surfactant breaker fluid was slowly poured down the side of the cell and the stirrer cap assembly was replaced on top of the cell. The HT/HP cell was placed back in the pre-heated jacket at 150° F. and pressurized with 250-psi nitrogen. The breaker fluid was stirred for 10 minutes at 300-rpm to simulate pumping of the Formulation down the wellbore. Stirring rate was monitored and maintained with a speed controller and tachometer located on the motor assembly. After the 10-minute period, the stirrer mechanism was shut off and the breaker treatment was allowed to stand for 17 hours at 150° F. with 250-psi nitrogen pressure. After the 17-hour static treatment soak, the stirrer mechanism was restarted for a 10-minute period at 300-rpm to simulate pumping the breaker treatment from the wellbore. After the 10-minute period, stirring was stopped and the HT/HP cell was removed from the heater jacket and the pressure released. The HT/HP top cap was removed, and the breaker fluid was decanted out. The HT/HP cell bottom cap was removed and the hardened filter paper was removed to observe the remaining mud filter cake.

The post-treatment filter cake was evaluated for thickness and remaining solids weight. Differences between the initial and post-treatment mud filter cake weight were used to calculate the % Removal Efficiency of the synthetic oil-based/surfactant system on each mud filter cake. Table II sets forth the % Removal Efficiency for the 10 test mud systems to cleanup oil based and synthetic oil based mud filter cakes.

TABLE II

| Example No. | % Removal Efficiency |
|---|---|
| 2 | 92% |
| 3 | 99% |
| 4 | 95% |
| 5 | 75% (after drying, the remaining solids were shown to be non-emulsified solids.) |
| 6 | 88% |
| 7 | 92% |
| 8 | 85% |
| 9 | 99% |
| 10 | 96% |
| 11 | 85% |

As set forth in Table II, Examples 2-11 demonstrate the effectiveness of the synthetic oil-based/surfactant fluids in breaking down the interfacial rheological properties and in acting as an demulsifier to break the water-in-oil emulsions of a wide range of mud types. Furthermore, the fluids are very efficient in breaking the emulsion inside the filter cake to decrease cake cohesion and well bore adherence.

From the foregoing, it will be observed that numerous variations and modifications may be effected without departing from the true spirit and scope of the novel concepts of the invention.

What is claimed is:

1. A method of removing a filter cake from a wellbore which comprises introducing a biodegradable water-in-synthetic oil base emulsion into the wellbore, the emulsion comprising an external phase of a surfactant emulsified in the base oil, the base oil comprising between from about 75 to about 99 percent by weight of linear paraffins.

2. The method of claim 1, wherein the water-in-synthetic oil base emulsion further comprises a pH adjuster.

3. The method of claim 1, wherein the base oil of the external phase comprises alkenes and between from 85 to about 95 percent by weight of linear paraffins.

4. The method of claim 3, wherein the base oil of the external phase comprises about 90 weight percent of linear paraffins.

5. The method of claim 1, wherein the surfactant is non-ionic.

6. The method of claim 5, wherein the volume percent of the nonionic surfactant in the water-in-synthetic oil base emulsion is between from about 3 to about 15 percent.

7. The method of claim 5, wherein the nonionic surfactant is selected from the group consisting of octylphenol polyethylene oxide ethers, nonylphenol polyethylene oxide ethers, linear alcohol polyethylene oxide ethers and sorbitan monooleate polyethylene oxide ethers.

8. The method of claim 7, wherein the nonionic surfactant is sorbitan monooleate polyethylene oxide ether.

9. The method of claim 1, wherein the volume percent of the hydrocarbon blend in the water-in-synthetic oil base emulsion is between from about 50 to about 70 percent.

10. The method of claim 1, wherein the water-in-synthetic oil base emulsion further comprises an alcohol, glycol or glycol ether.

11. The method of claim 1, wherein the filter cake is an oil base or synthetic oil base filter cake.

12. A method of removing a filter cake from a wellbore which comprises introducing a biodegradable water in oil emulsion into the wellbore, the water-in-oil emulsion comprising:
   (a) a hydrocarbon blend comprising alkenes and between from about 75 to about 99 percent by weight of linear paraffins;
   (b) a surfactant substantially emulsified in the hydrocarbon blend; and
   (c) water.

13. The method of claim 12, wherein the water-in-oil emulsion further comprises a pH adjuster component.

14. The method of claim 12, wherein the hydrocarbon blend comprises between from about 85 to about 95 percent by weight of linear paraffins.

15. The method of claim 14, wherein the hydrocarbon blend comprises about 90 weight percent of linear paraffins.

16. The method of claim 12, wherein the surfactant is nonionic.

17. The method of claim 16, wherein the nonionic surfactant is selected from the group consisting of octylphenol polyethylene oxide ethers, nonylphenol polyethylene oxide ethers, linear alcohol polyethylene oxide ethers and sorbitan monooleate polyethylene oxide ethers.

18. A method of removing an oil based or synthetic oil based filter cake from a wellbore which comprises introducing a biodegradable water in oil emulsion into the wellbore, the water-in-oil emulsion comprising an external phase of a surfactant substantially emulsified in a hydrocarbon blend.

19. The method of claim 18, wherein the surfactant is nonionic.

20. The method of claim 19, wherein the nonionic surfactant is selected from the group consisting of octylphenol polyethylene oxide ethers, nonylphenol polyethylene oxide ethers, linear alcohol polyethylene oxide ethers and sorbitan monooleate polyethylene oxide ethers.

* * * * *